United States Patent [19]
Mattori et al.

[11] 3,966,264
[45] June 29, 1976

[54] COMPENSATION FOR ANTI-SKID BRAKE CONTROL SYSTEM

[75] Inventors: Hiroaki Mattori, Yamatokoriyama; Takemi Mizuta, Osaka; Shinzi Okamoto, Yamatokoriyama, all of Japan

[73] Assignee: Sharp Kabushiki Kaisha, Osaka, Japan

[22] Filed: July 22, 1974

[21] Appl. No.: 490,303

[30] Foreign Application Priority Data
July 23, 1973  Japan.............................. 48-82905

[52] U.S. Cl. ..................... 303/21 BE; 180/82 R; 188/181 C; 303/21 A
[51] Int. Cl.² ............................................ B60T 8/10
[58] Field of Search ..................... 180/82 R, 105 E; 188/181 C; 303/20, 21; 307/10 R; 317/5; 324/161; 340/53, 263

[56] References Cited
UNITED STATES PATENTS

| | | | |
|---|---|---|---|
| 3,288,232 | 11/1966 | Shepherd | 303/21 EB X |
| 3,574,415 | 4/1971 | Stamm | 303/21 EB |
| 3,706,351 | 12/1972 | Neisch | 303/21 EB X |
| 3,797,892 | 3/1974 | Leiber | 303/20 X |
| 3,834,770 | 9/1974 | Fleischer et al. | 303/21 P |

FOREIGN PATENTS OR APPLICATIONS

| | | | |
|---|---|---|---|
| 2,112,669 | 10/1972 | Germany | 303/21 A |
| 1,235,016 | 6/1971 | United Kingdom | 303/21 BE |

Primary Examiner—Duane A. Reger
Assistant Examiner—Stephen G. Kunin
Attorney, Agent, or Firm—Stewart and Kolasch, Ltd.

[57] ABSTRACT

An anti-skid brake control system wherein the brake force is automatically reduced in response to the relationship between the sensed values of the vehicle velocity and the wheel velocity, may erroneously operate at an undesired time when the vehicle is making a turn. The above-mentioned erroneous operation is caused by the misdetermination of the vehicle velocity which based on the difference of the velocities between the outside rear wheel and the inside rear wheel while making the turn. To avoid the erroneous operation, a steering wheel sensor is provided for sensing the angle of a steering wheel. Output signals of the steering wheel sensor are applied to a compensation circuit for compensating output signals of a wheel sensor which detects the velocity of the wheel of a wheeled vehicle, the detected value being used for the determination of the velocity of the vehicle, for the purpose of minimizing the difference of the wheel velocities.

6 Claims, 4 Drawing Figures

COMPENSATION FOR ANTI-SKID BRAKE CONTROL SYSTEM

BACKGROUND AND SUMMARY OF THE INVENTION

The present invention relates to a compensation device for compensating the operation of an anti-skid brake control system when the vehicle makes a turn.

The anti-skid brake control system of the slip modulus type calculates the slip modulus in accordance with the following equation: (slip modulus) =(vehicle velocity — wheel velocity) / (vehicle velocity) The anti-skid control system is enabled to prevent the occurrence of the skid condition when the slip modulus is beyond a predetermind value, preferably 0.20 – 0.30, after the driver brakes the vehicle.

In the anti-skid brake control system of the slip modulus type, a pick up coil is provided adjacent to the wheel of the vehicle for sensing the velocity of the wheel with the use of frequency signals from the pick up coil. The sensed value of the wheel velocity is then used for determining the vehicle velocity. In the case where a plurality of pick up coils are provided adjacent to a plurality of wheels, in general two pick up coils are provided adjacent to the left rear and right rear wheels, the maximum sensed value from the pick up coils is determined approximately as the velocity of the vehicle and the minimum sensed value from the pick up coils is determined as the velocity of the wheel. It is clear that the wheel velocities of the left rear wheel and the right rear wheel differ each other when the vehicle makes a turn. The anti-skid brake control system may be enabled when the vehicle makes a sharp turn, since the above-mentioned difference of the wheel velocities increases and hence the slip modulus may exceed the predetermined value. In the case where a pick up coil is provided adjacent a wheel and the sensed value from the pick up coil is treated electrically to determine the vehicle velocity and the wheel velocity, the anti-skid brake control system may be enabled when the vehicle makes a turn. That is, if the pick up coil is provided adjacent to the wheel which travels inside of the turn, the wheel velocity is less than the determined vehicle velocity.

In the anti-skid control system of the deceleration type wherein a pick up coil is provided adjacent to a wheel, the system may be enabled when the vehicle makes a sharp turn, since the detected deceleration value may exceed the predetermined value when the wheel provided with the pick up coil travels inside of the turn.

It is very dangerous that the anti-skid brake control system is enabled when the vehicle makes a turn, since a brake system does not work well in a normal strength even though the driver brakes the vehicle.

Accordingly, an object of the present invention is to provide an anti-skid brake control system which is not enabled at an erroneous condition.

To this end, the present system includes a steering wheel sensor for sensing an angle of a steering wheel when the vehicle makes a turn. Output signals of the steering wheel sensor are applied to a compensation circuit for compensating output signals of a wheel sensor which detects the velocity of the wheel of a wheeled vehicle, thereby preventing the erroneous operation of the anti-skid brake control system.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
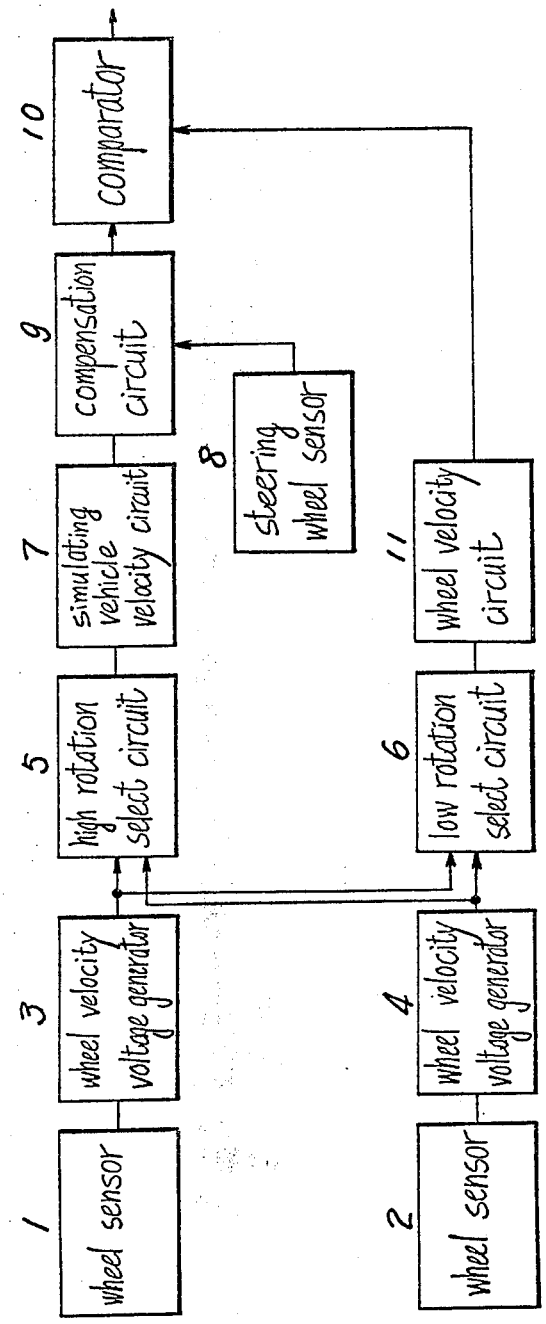
FIG. 1 is a block diagram of an example of an antiskid brake control system including a compensation circuit of the present invention.

Referring now to FIG. 1, there is illustrated a block diagram of an example of an anti-skid brake control system of the present invention. The embodiment of FIG. 1 is concerned with an anti-skid brake control system of the slip modulus type wherein two wheel sensors are provided adjacent to two wheels, for example left rear and right rear wheels, and output signals of the wheel sensors are used for calculating the slip modulus.

A wheel sensor 1 is provided adjacent to the left rear wheel while a wheel sensor 2 is provided adjacent to the right rear wheel. Both sensors are adapted to generate frequency signals in response to the rotational velocities of the wheels of the vehicle. Output signals of the wheel sensors 1, 2 are applied to wheel velocity voltage generators 3, 4, respectively, in which D.C. voltage signals are produced in proportion to the rotational velocities of the wheels. The generators 3, 4 mainly comprise digital-to-analog converters which generate D.C. voltage signal in response to pulse signals, the pulse signals being created in response to the frequency signals from the wheel sensors 1, 2. Each output of the generators 3, 4 are concurrently applied to a high rotation select circuit 5 and to a low rotation select circuit 6. The high rotation select circuit 5 compares the outputs from the generators 3, 4 with each other and provides higher rotation signals of the two signals at the output terminal thereof. The low rotation select circuit 6 compares the outputs from the generators 3, 4 with each other and provides lower rotation signals of the two signals at the output terminal thereof.

The output signals of the high rotation select circuit 5 are applied to a simulating vehicle velocity circuit 7, which determines simulated velocity of the vehicle by storing the vehicle velocity in a manner that a capacitor within the circuit 7 is charged by the output voltage from the circuit 5 when the wheel velocity increases and that the capacitor is discharged when the wheel velocity decreases. Simulated vehicle velocity signals are applied to a comparator 10 via a compensation circuit 9 which also receives signals from a steering wheel sensor 8 for detecting an angle of a steering wheel.

Figures 2, 3:
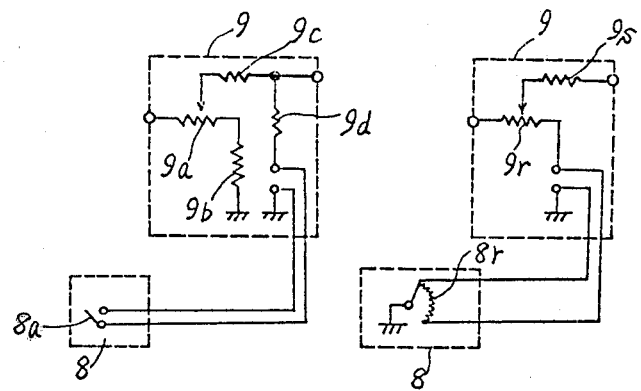
FIG. 2 is a circuit diagram of an embodiment of the compensation circuit.
FIG. 3 is a circuit diagram of another embodiment of the compensation circuit.

Typical circuit constructions of the steering wheel sensor 8 and the compensation circuit 9 are shown in FIGS. 2 and 3. In the embodiment of FIG. 2, the steering wheel sensor 8 comprises a switch 8a and the compensation circuit 9 comprises a variable resistor 9a and three resistors 9b, 9c and 9d, the resistors and the switch being connected to form a voltage divider circuit as shown in the drawing. The switch 8a is closed when the steering wheel is turned more than a predetermined angle in a clockwise or a counter-clockwise direction. The operation of the compensation circuit 9 will be described later.

In the embodiment of FIG. 3, the steering wheel sensor 8 comprises a potentiometer 8r. The potentiometer 8r, a variable resistor 9r and a resistor 9s are connected to form a voltage divider circuit in the compensation circuit 9. The movable arm of the potentiometer 8r shifts its position in response to the turning of the steering wheel in a clockwise or a counter-clockwise direction.

Output signals of the low rotation select circuit 6 are applied to another input terminal of the comparator 10 via a wheel velocity circuit 11, which increases D.C. voltage signals in accordance with an increase in the wheel velocity. The comparator 10 typically comprises a differential amplifier which compares the simulated and compensated vehicle velocity voltage signals with the wheel velocity voltage signals: the first-named signals being generated through the simulating vehicle velocity circuit 7 and the compensation circuit 9 as set forth above. The comparator 10 generates pressure reduction signals effective to reduce the brake pressure when the ratio of the deceleration of the wheel velocity to the vehicle velocity exceeds a predetermined value, for example, 0.20, and hence the vehicle is in the skid condition. The pressure reduction signals are duly amplified and then applied to the brake system (not shown) to reduce the brake pressure.

In the normal driving condition, the comparator 10 receives the wheel velocity signals approximately equals to the simulated vehicle velocity signals, that is, the slip modulus approximates zero, and hence the pressure reduction signals are not generated.

Figure 4:
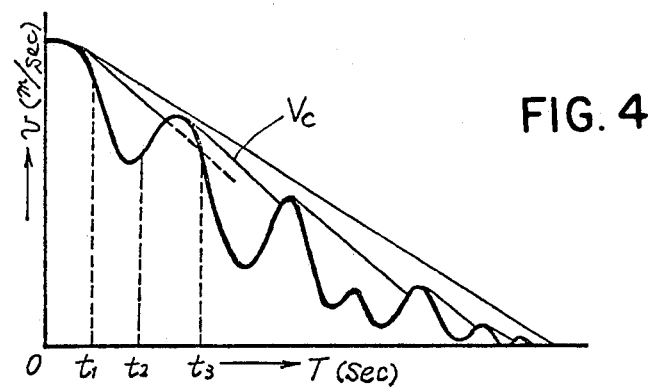
FIG. 4 is a chart for the purpose of explanation of the operation of the antiskid brake control system of FIG. 1.

When the driver sharply brakes the vehicle, the wheel velocity signals from the wheel velocity circuit 11 fall in voltage rapidly in comparison with the simulated vehicle velocity signals from the simulating vehicle velocity circuit 7. In the course of the voltage falling, when the slip modulus exceeds a predetermined value, as shown at the time $t_1$ of FIG. 4, the comparator 10 detects the skid condition and generates the pressure reduction signals for the purpose of reducing the brake pressure. Then, when the wheel velocity increases to exceed a predetermined value by the pressure reduction at the time $t_2$ of FIG. 4, the brake pressure increases again. Subsequently, when the wheel velocity exceeds the simulated vehicle velocity, the simulated vehicle velocity $V_c$ is forced to increase and to approximate the actual vehicle velocity. This is achieved by charging the capacitor within the circuit 7 and storing the simulated vehicle velocity on the capacitor. Thereafter, when the slip modulus exceeds a predetermined value again because of the increase in the brake pressure and hence the decrease in the wheel velocity, at the time $t_3$ the comparator 10 detects the skid condition so that the brake pressure is reduced. These operations are repeated sequentially until the vehicle stops.

The following is concerned with the operation of the anti-skid brake control system of the present invention when the steering wheel is turned and the difference in the velocities between the outside wheel and the inside wheel during the turn of the vehicle has occurred. In the embodiment of FIG. 2, the switch 8a of the steering wheel sensor is closed when the turning angle of the steering wheel is beyond a predetermined value. When the switch 8a is closed, the output voltage value of the compensation circuit 9 is reduced relative to the input voltage value thereto. The output voltage value of the compensation circuit 9 at the time when the switch 8a is opened may be expressed as follows:

$$Eo = \frac{b+c}{a+b+c} \times Ei$$

where Eo is the output voltage value;
Ei is the input voltage value;
a is the resistance value viewed from the hot line side of the variable resistor 9a;
b is the resistance value viewed from the earth side of the variable resistor 9a; and
c is the resistance value of the resistor 9b.

On the other hand, the output voltage value of the compensation circuit 9 at the time when the switch 8a is closed may be expressed as follows:
E'o = Eo × e/d + e
where E'o is the output voltage value when the switch is closed;
d is the resistance value of the resistor 9c; and
e is the resistance value of the resistor 9d.

The simulated vehicle velocity is reduced by the compensation circuit 9 and hence it is approximately equal to the wheel velocity, when the angle of the steering wheel exceeds a predetermined value. Therefore, the comparator 10 does not detect the skid condition and hence the pressure reduction signals are not generated.

In the embodiment of FIG. 3, the resistance value of the variable resistor 8a varies proportionally in accordance with the angle of the steering wheel. The relationship between the input voltage value Ei and the output voltage value Eo of the compensation circuit 9 can be expressed as follows:

$$Eo = \frac{b+c}{a+b+c} \times Ei$$

Where a is the resistance value from the hot line side of the variable resistor 9r;
b is the resistance value from the earth side of the variable resistor 9r; and
c is the resistance value of the variable resistor 8r.

The simulated vehicle velocity is reduced in proportion to the current angle of the steering wheel and the simulated vehicle velocity is approximately equal to the wheel velocity. Therefore, the pressure reduction signals are not generated under any undesired conditions, for example, such as the time when the vehicle is making a turn.

In the above discussed embodiments, the simulated vehicle velocity signals are compensated in response to the steering angle. It is clear that the same effects can be obtained by compensating the wheel velocity signals in response to the steering angle. In the anti-skid brake control system of the type wherein only one wheel sensor is provided adjacent to a left rear or a right rear wheel and the detected signals from the wheel sensor are used for creating the wheel velocity signals and the vehicle velocity signals, the compensation may be carried out in a similar fashion. That is, when the wheel provided with the wheel sensor travels inside the turn, the value of the simulated vehicle velocity is reduced or the value of the wheel velocity is increased by the signals from the steering sensor. Moreover, in the anti-skid brake control system of the deceleration type wherein a wheel sensor is provided adjacent to a wheel, the compensation may be carried out by decreasing the value of the deceleration signals when the wheel provided with the wheel sensor travels inside the turn.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an anti-skid brake control system of the slip modulus type, for use in a vehicle having at least a wheel and a steering wheel, in which pressure reduction signals for the purpose of reducing the brake pressure are generated when the slip modulus exceeds a predetermined value, an arrangement for preventing the erroneous generation of brake pressure reduction signals when the vehicle is making a turn comprising:
   a wheel sensor provided adjacent to the wheel for generating wheel velocity signals in response to the rotational velocity of the wheel;
   means for generating simulated vehicle velocity signals in response to the wheel velocity signals;
   a steering wheel sensor for generating steering angle signals in response to the angle of the steering wheel; a compensation circuit for reducing the value of the simulated vehicle velocity signals in response to the steering angle signals; and
   a comparator for comparing the wheel velocity signals with output signals of the compensation circuit, the comparator producing pressure reduction signals for reducing the brake pressure of the brake system within the vehicle when the difference in value between the wheel velocity signals and the output signals of the compensation circuit is beyond a predetermined value.

2. The anti-skid brake control system set forth in claim 1 wherein the steering wheel sensor generates compensation signals when the turning angle of the steering wheel exceeds a predetermined value.

3. The anti-skid brake control system set forth in claim 1 wherein the steering wheel sensor generates steering angle signals in proportion to the angle of the steering wheel.

4. The anti-skid brake control system set forth in claim 1 wherein the compensation circuit is of a voltage divider construction.

5. In an anti-skid brake control system of the slip modulus type, for use in a vehicle having a plurality of wheels and a steering wheel, in which pressure reduction signals for the purpose of reducing the brake pressure are generated when the slip modulus exceeds a predetermined value, an arrangement for preventing the erroneous generation of brake pressure reduction signals when the vehicle is making a turn comprising:
   a plurality of wheel sensors provided adjacent to the plurality of wheels for generating velocity signals in response to the rotational velocities of the wheels;
   means for selecting the maximum velocity signals of the velocity signals, the maximum velocity signals being used as vehicle velocity signals;
   means for selecting the minimum velocity signals of the velocity signals, the minimum velocity signals being used as wheel velocity signals;
   a steering wheel sensor for generating steering angle signals in response to the angle of the steering wheel; a compensation circuit for reducing the value of the vehicle velocity signals in response to the steering angle signals; and a comparator for comparing the wheel velocity signals with the compensated vehicle velocity signals and generating pressure reduction signals for reducing the brake pressure of the brake system within the vehicle when the difference in value between the wheel velocity signals and the compensated vehicle velocity signals is beyond a predetermined value.

6. The anti-skid brake control system set forth in claim 5 wherein the wheel sensors are provided adjacent to the left rear wheel and the right rear wheel of the vehicle.

* * * * *